G. T. RIDDLE.
Sawing-Machines.
No. 143,033. Patented September 23, 1873.
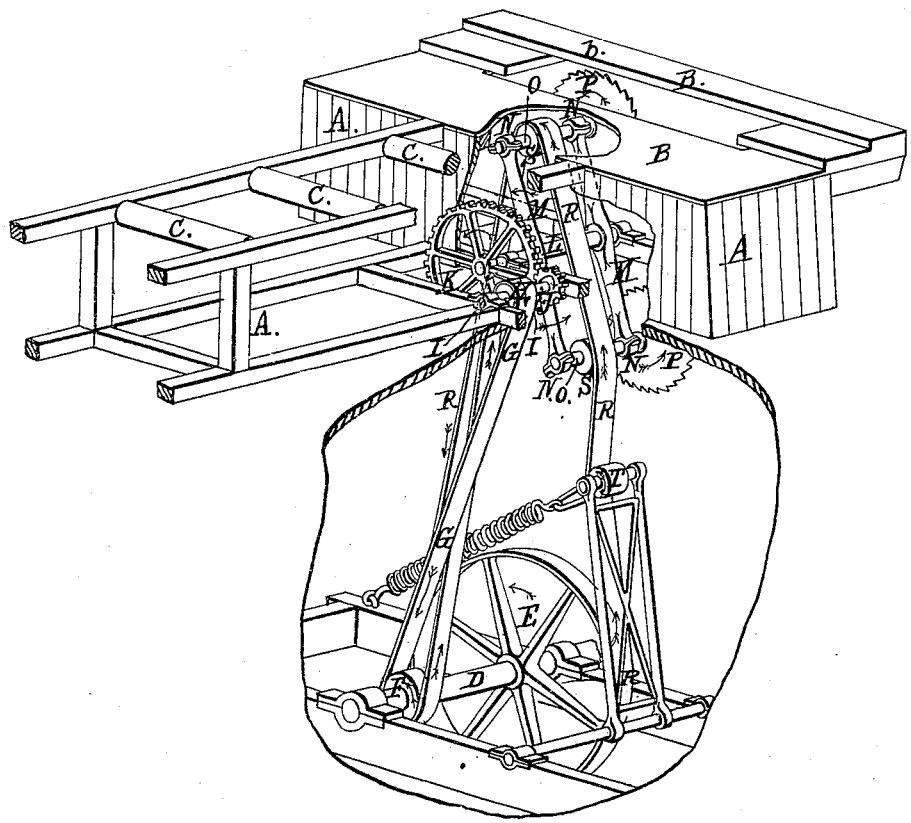
ATTEST:
Robert Burns.
Walter Allen.
INVENTOR:
George T. Riddle
By Knight Bros
Attys.

UNITED STATES PATENT OFFICE.

GEORGE T. RIDDLE, OF ST. LOUIS, MISSOURI.

IMPROVEMENT IN SAWING-MACHINES.

Specification forming part of Letters Patent No. 143,033, dated September 23, 1873; application filed August 11, 1873.

*To all whom it may concern:*

Be it known that I, GEORGE T. RIDDLE, of St. Louis, of St. Louis county, Missouri, have invented an Improvement in Sawing-Machines, of which the following is a specification:

My invention consists in the arrangement of two circular saws on different mandrels and in the same plane, the mandrels having journal-bearings at the opposite ends of cross-arms attached to a shaft which has constant rotation, causing the saws to alternately project above the top of the table, upon which the stuff to be sawn is supported, the stuff being forwarded (in a direction transverse to the saws) when both saws are beneath the table, and remaining at rest while the saw is passing through it, the feed of the saw (its movement through the wood) being caused by the forward movement of the saw, and not by the movement of the stuff, as is usual.

The drawing is a perspective view of my improvement.

A is the frame, which may be of any suitable construction. B is the table. C C are rollers, supporting the stuff. D is a shaft, carrying a larger pulley, E, and a smaller one, F. The smaller pulley F has a belt, G, passing over a pulley, H, on a shaft, I, which carries a spur-wheel, J, and said wheel engages a larger spur-wheel, K, on a shaft, L, which carries cross-arms M M, carrying at their ends boxes N N, in which turn the mandrels O of the saws P. The saws receive rotation from a single belt, R, passing around both pulleys S S, and extending around the large pulley E on the shaft D. The shaft D may be turned by belt or cog gearing, or by any other means desired. An "idler," T, is applied to the belt R to prevent any slackness occurring from change of position in the pulleys S S, (on the saw-mandrels,) consequent on their revolution around the axis L.

The saws are made to revolve around and with the shaft L, by the belt G, through the means of the pulley, H, shaft I, and spur-wheels J K.

The stuff to be sawn—say, a long plank to be cut up into lengths—is laid upon the rollers C and table B, and its end pushed against the stop $b$, when both saws are beneath the table. The revolution of the saws on the shaft L brings one of them (or part of one of them) above the table, and carries it through the plank. The separated block is then removed, and while both saws are beneath the table, the plank is pushed forward, and another block is cut off by the other saw.

In constructing my machine for some uses, I propose to place the shaft L on the same level as the stuff in which the saws would cut on the downward part of their revolution, and in this case the planks would be placed on edge, the edge resting steadily on the rollers C and table B from end to end, and thus insuring the transverse cut, made by the saws being at right angles with the edge.

I do not claim, broadly, the arrangement of circular saws at opposite ends of arms attached centrally to a horizontal shaft, as I am aware that such arrangement is not new.

I claim—

The saws P P, at the ends of the arms M M, attached to the shaft L, in combination with the shaft D carrying the pulleys E F, the shaft I carrying the pulley H, and pinion J engaging with gear-wheel K and the belts G R, whereby the saws have simultaneous rotation on their axes O O, and continuous revolution around their common shaft L, all as herein shown and described.

GEORGE T. RIDDLE.

Witnesses:
SAML. KNIGHT,
ROBERT BURNS.